United States Patent
Fripp et al.

(10) Patent No.: US 12,234,405 B2
(45) Date of Patent: Feb. 25, 2025

(54) PACKER ELEMENTS WITH LOW THERMAL EXPANSION

(71) Applicant: Halliburton Energy Services, Inc., Houston, TX (US)

(72) Inventors: Michael Linley Fripp, Singapore (SG); Xiaoguang Allan Zhong, Singapore (SG); Shobeir P. Gar, Carrollton, TX (US); Sandeep Thatathil, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 27 days.

(21) Appl. No.: 18/087,797

(22) Filed: Dec. 22, 2022

(65) Prior Publication Data

US 2024/0209251 A1    Jun. 27, 2024

(51) Int. Cl.
*C09K 8/42* (2006.01)
*E21B 33/12* (2006.01)

(52) U.S. Cl.
CPC .......... *C09K 8/426* (2013.01); *E21B 33/1208* (2013.01)

(58) Field of Classification Search
CPC .............................. C09K 8/426; E21B 33/1208
See application file for complete search history.

(56) References Cited

U.S. PATENT DOCUMENTS

| | | | |
|---|---|---|---|
| 6,305,477 B1 | 10/2001 | Carisella et al. | |
| 7,347,242 B2 | 3/2008 | Agostini et al. | |
| 7,557,492 B2 | 7/2009 | Fripp et al. | |
| 8,607,883 B2 | 12/2013 | Sevre | |
| 9,193,879 B2 | 11/2015 | Chakraborty et al. | |
| 10,047,261 B2 | 8/2018 | Akulichev et al. | |
| 10,975,658 B2 | 4/2021 | Zhang et al. | |
| 2010/0313987 A1 | 12/2010 | Salama et al. | |
| 2012/0125640 A1 | 5/2012 | Sevre | |
| 2016/0068728 A1 | 3/2016 | Akulichev et al. | |
| 2017/0191565 A1* | 7/2017 | Cheng | E21B 33/00 |
| 2017/0247983 A1* | 8/2017 | Funkhouser | C09K 8/032 |
| 2020/0362662 A1* | 11/2020 | Zhang | C09K 8/46 |
| 2022/0243552 A1* | 8/2022 | Least | E21B 33/134 |

FOREIGN PATENT DOCUMENTS

| | | |
|---|---|---|
| DE | 102017104789 A1 | 9/2018 |
| JP | 58-170969 A | 10/1983 |
| WO | 94-03743 A1 | 2/1994 |

OTHER PUBLICATIONS

International Search Report and Written Opinion mailed Sep. 21, 2023 for PCT/US2022/054340.

* cited by examiner

*Primary Examiner* — Crystal J Lee
(74) *Attorney, Agent, or Firm* — The Hilton Firm PLLC (57) ABSTRACT

Methods and apparatus for performing a sealing operation. A sealing element is introduced into a wellbore having a temperature. The sealing element comprises a material having a positive coefficient of thermal expansion (CTE), and a material having a negative CTE. The sealing element is expanded to contact an adjacent surface. The material having a negative CTE expands when the wellbore temperature is decreasing and the expansion of the negative CTE material maintains contact of the sealing element with the adjacent surface while the wellbore temperature is decreasing.

18 Claims, 8 Drawing Sheets

PACKER ELEMENTS WITH LOW THERMAL EXPANSION

TECHNICAL FIELD

The present disclosure relates generally to sealing operations, and more particularly, to the use of sealing elements that incorporate materials having a negative coefficient of thermal expansion.

BACKGROUND

Sealing elements may be used to form seals in high temperature environments such as a wellbore. Sealing elements may function by deforming in such a way to apply expansive pressure to an adjacent surface. A seal is formed when the expansive pressure prevents flow of a material (e.g., a fluid) across the interface of the deformed sealing element and the adjacent surface. In some wellbore operations, wellbore cooling may occur naturally or may be induced due to well injection or other operation. During periods of wellbore cooling, those sealing elements having a positive coefficient of thermal expansion may contract, thereby reducing the expansive pressure applied to an adjacent surface.

Mitigation of the contraction of a sealing element during periods of wellbore cooling may allow for the use of sealing elements over a wider range of temperatures. The present invention provides improved apparatus and methods for sealing in environments subjected to fluctuations in temperature.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

The present disclosure relates generally to sealing operations, and more particularly, to the use of sealing elements that incorporate materials having a negative coefficient of thermal expansion.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The examples described herein relate to the use of sealing elements that incorporate materials having a negative coefficient of thermal expansion. The sealing elements are constructed to possess a reduced coefficient of thermal expansion (hereafter "CTE"). This reduction in the CTE is achieved by adding a filler material having a negative CTE to the positive CTE elastomeric material of the sealing element. As the surrounding wellbore environment cools, the negative CTE filler material will expand thereby countering the contraction of the positive CTE elastomeric material to a degree. As such, the sealing element may maintain its expansive pressure when cooling occurs in the surrounding wellbore environment. One advantage of the sealing elements disclosed herein is that they may be used in a wider range of temperature environments than similar elastomeric sealing elements without the negative CTE material. Another advantage of the disclosed sealing elements is that they may be used in a variety of wellbore tools such as swell packers, liner hangers, gland seals, or as compression set sealing elements. A further advantage of the disclosed sealing elements is that they may utilize a variety of negative CTE materials including those that function via geometric frustration effects, volumetric increases due to martensitic structural transition, lattice changes, or changes in polarization of the material. One additional advantage of the sealing elements is that the negative CTE material may be used with a variety of elastomeric materials including those that deform due to compression, those that deform due to swelling from the absorption of the fluids, and those that deform because they are attached to a plastically deforming tubing.

The sealing elements comprise the combination of a negative CTE material and a positive CTE material. The combination and distribution of the negative CTE material within the elastomeric positive CTE material, produces a sealing element with a reduced CTE that maintains a degree of expansion upon cooling. The degree of expansion and contraction as well as the temperature ranges in which these effects occur is a function of the negative CTE material selected and its distribution within the sealing element, the positive elastomeric CTE material selected and its distribution within the sealing element, and the ratio of their relative concentrations within the sealing element.

The sealing elements function by expanding to apply a force to an adjacent structure (e.g., an adjacent tubing, liner, casing, or wellbore wall). This expansive pressure may be applied in a cooling environment. A cooling environment is any environment, such as a wellbore, in which the temperature is decreasing. The rate of temperature decrease may be a factor, in some examples, in the rate of expansion of the negative CTE filler material. An environment cooling at a faster rate may induce a faster rate of expansion, whereas an environment cooling at a slower rate may induce a slower rate of expansion for the negative CTE filler material. Regardless, the negative CTE filler material expands in any environment that is cooling. The expansive force applied to the adjacent structure may be maintained so long as the sealing element continues to expand or to maintain its expansion either due to the expansion of the positive CTE material or the negative CTE material.

Figure 1:
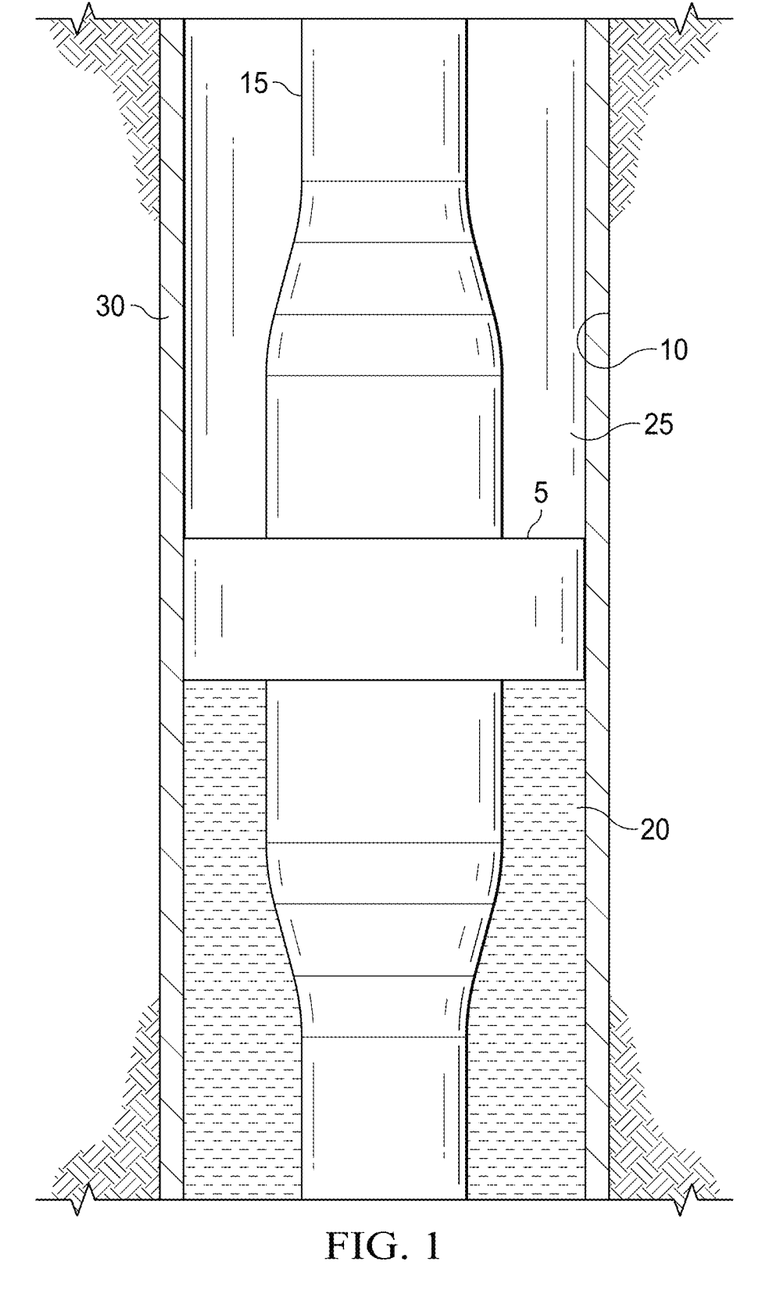
FIG. 1 is a schematic illustrating an example of a fluid-swelling sealing element in accordance with one or more examples described herein.

FIG. 1 is a schematic illustrating an example sealing element 5 as disposed in a wellbore 10. The sealing element 5 is a fluid-swellable sealing element disposed on a tubing 15 (or mandrel in other examples). The sealing element 5 may be bolted, welded, threaded, screwed, adhered, swaged, fixed, or otherwise disposed on the tubing 15 in any manner as would be readily apparent to one of ordinary skill in the art. In some optional examples, the sealing element 5 is not fixed on the tubing 15 but may be positioned between end rings (not illustrated) which may be fixed to the tubing 15 to prevent axial movement of the sealing element 5. These end rings may also shield and prevent abrasion of the sealing element 5 during transport in some examples. The sealing element 5 has been contacted by fluid 20 which is disposed in the annulus 25 between the tubing 15 and an adjacent casing 30 (or other tubing, wellbore wall, etc.). The sealing element 5 may swell from contact with any swell inducing fluid 20 and may be any type of swellable sealing element 5. The sealing element 5 may swell from contact with aqueous fluids, oleaginous fluids, and/or combinations of aqueous and oleaginous fluids. The sealing element 5 comprises a positive CTE swellable elastomeric material and a negative CTE filler material. As used herein, the term "positive CTE material" refers to a material having a numerically positive CTE. As used herein, the term "negative CTE material" refers to a material having a numerically negative CTE. Examples of positive and negative CTE materials are provided below. Should the wellbore temperature cool, the negative CTE filler material may expand, thereby mitigating the contraction of the positive CTE elastomeric material to some degree. The sealing element 5 may be designed such that sufficient expansive pressure from the negative CTE material is produced for the range of temperatures experienced by the wellbore 10.

Figure 2:
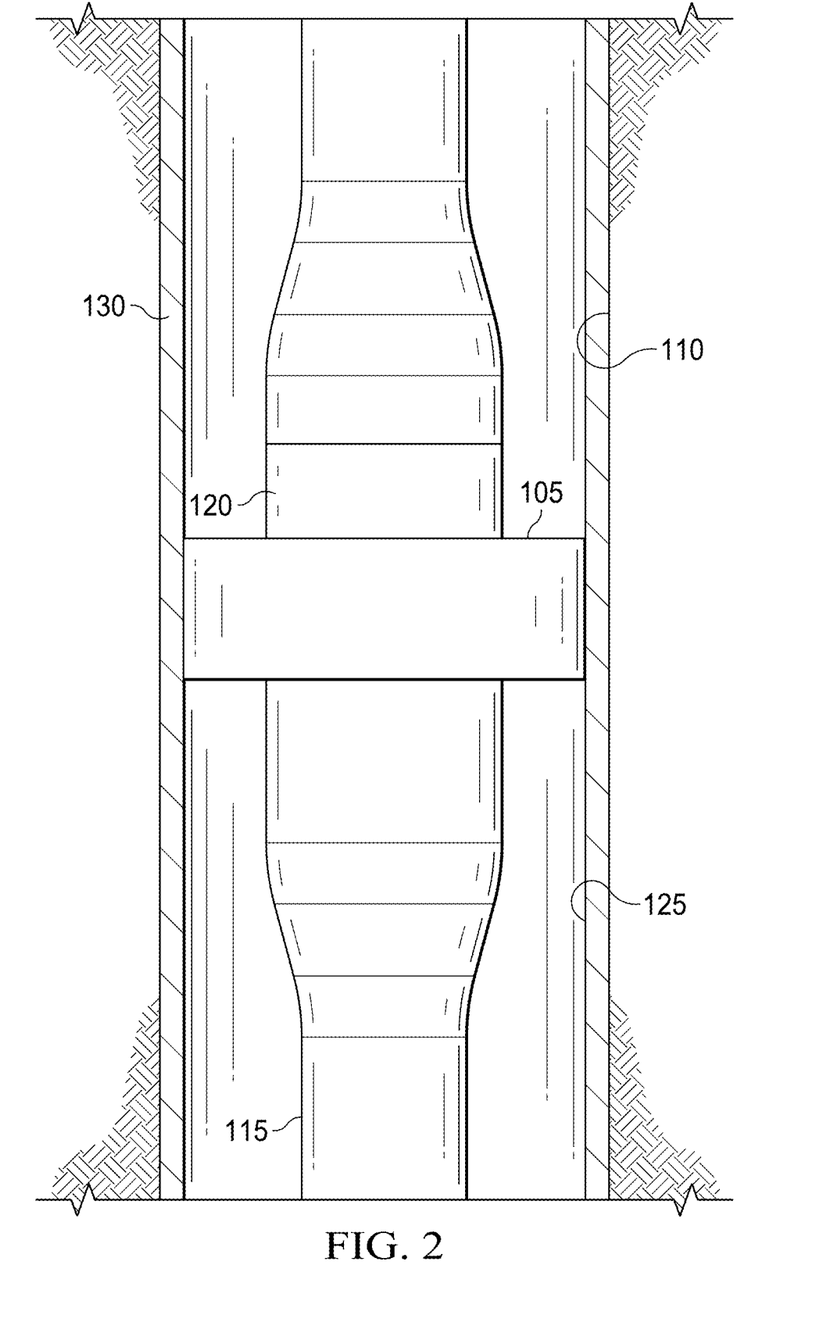
FIG. 2 is a schematic illustrating an example of a compression-set sealing element in accordance with one or more examples described herein.

FIG. 2 is a schematic illustrating an example compression set sealing element 105 as disposed in a wellbore 110. The sealing element 105 is a compression set sealing element disposed on a tubing 115 (or mandrel in other examples). The sealing element 105 may be bolted, welded, threaded, screwed, adhered, swaged, or otherwise fixed to the tubing 115 in any manner as would be readily apparent to one of ordinary skill in the art. The sealing element 105 has been expanded and set after a compression mechanism 120) applies pressure to the sealing element 105 to deform it such that it expanded outward to seal the annulus 125 between the tubing 115 and an adjacent casing 130 (or other tubing, wellbore wall, etc.). The compression mechanism 120 may be any mechanism for applying pressure to the sealing element 105 and may include a cone and slip assembly relying on tubing weight; an hydraulically setting assembly utilizing hydraulic pressure to compress the sealing element 105 with a cone, piston, or other component; a roto-mechanical assembly relying on tubing rotation to compress the sealing element 105; or any other such mechanism for applying compression to the sealing element 105 to initiate sealing element 105 deformation. Although, the compression mechanism 120 utilizes compression, it is to be understood that in some examples, the compression mechanism 120 may also utilize tension to expand the sealing element 105. The sealing element 105 comprises a positive CTE swellable elastomeric material and a negative CTE filler material. Should the wellbore temperature cool, the negative CTE filler material may expand, thereby mitigating the contraction of the positive CTE elastomeric material to some degree. The sealing element 105 may be designed such that sufficient expansive pressure from the negative CTE material is produced for the range of temperatures experienced by the wellbore 110.

Figure 3:
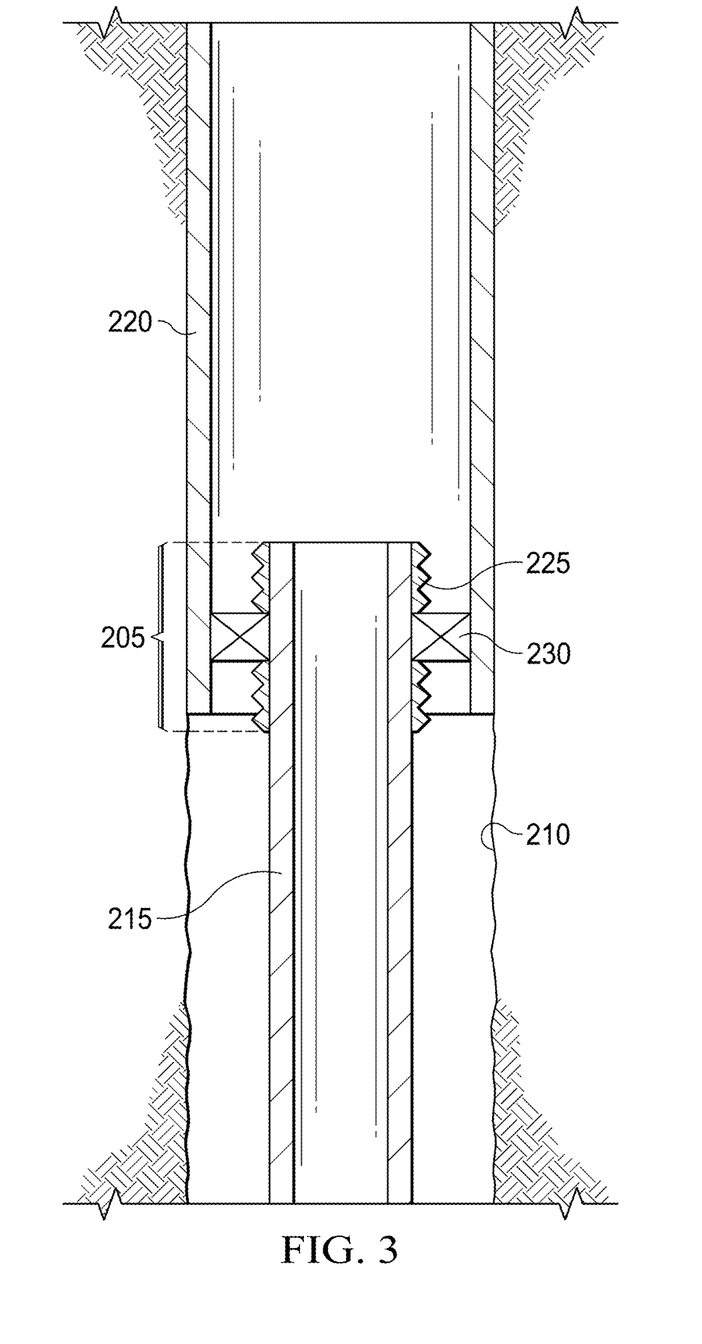
FIG. 3 is a schematic illustrating an example of a liner hanger with a sealing element in accordance with one or more examples described herein.

FIG. 3 is a schematic illustrating an example liner hanger 205 as disposed in a wellbore 210. The liner hanger 205 couples a liner 215 to a tubing 220 (or other conduit) to suspend the liner 215 in a wellbore 210. The liner hanger 205 may be bolted, welded, threaded, screwed, adhered, swaged, fixed, or otherwise disposed to the tubing 220 in any manner as would be readily apparent to one of ordinary skill in the art. The liner hanger comprises a sealing element 230 and circumferential ridge on opposing sides of the sealing element 230. The circumferential ridges 225 are optional and in some examples, may be used to prevent movement of the sealing element 230 when transported, for example, when placed downhole. The liner 215 is disposed within the wellbore 210 and suspended from the liner hanger 205. The sealing element 230 has been expanded and set after the liner 215 is positioned. The liner hanger 205 applies pressure to the tubing 220 by stretching and expanding its sealing element 230 outward to seal the annulus 225 between the liner 215 and the adjacent tubing 220. The sealing element 230 comprises a positive CTE elastomeric material and a negative CTE filler material. Should the wellbore temperature cool, the negative CTE filler material may expand, thereby mitigating the contraction of the positive CTE elastomeric material to some degree. In some examples, the liner hanger 205 comprises multiple sealing elements 230. All of the sealing elements 230, or only a portion of the sealing elements 230 may comprise the positive CTE elastomeric material and a negative CTE filler material. In some examples different species of sealing elements 230 may be used. The liner hanger 205 may be designed such that sufficient expansive pressure from the negative CTE material is produced for the range of temperatures experienced by the wellbore 210.

Figure 4:
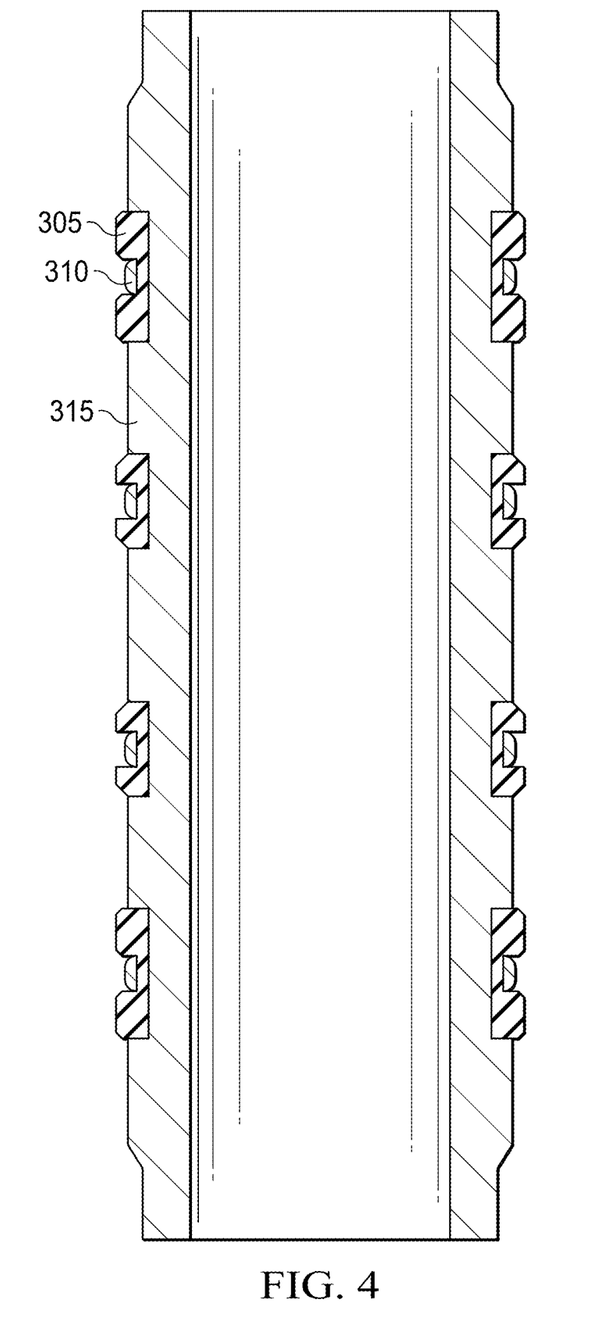
FIG. 4 is a perspective drawing illustrating an example of a crimped sealing element in accordance with one or more examples described herein.

FIG. 4 is an example of a specific species of sealing element 305. Sealing element 305 is a crimp seal. A centering ring 310 is disposed over the top of the sealing element 305. The sealing element 305 is fit to exterior grooves disposed on the profile of a mandrel 315. The sealing element 305 expands outward to seal an adjacent annular space. The sealing element 305 comprises a positive CTE swellable elastomeric material and a negative CTE filler material. Should the wellbore temperature cool, the negative CTE filler material may expand, thereby mitigating to some degree, the contraction of the positive CTE elastomeric material. The sealing element 305 may be designed such that sufficient expansive pressure from the negative CTE material is produced for the range of temperatures experienced by the wellbore.

Figure 5:
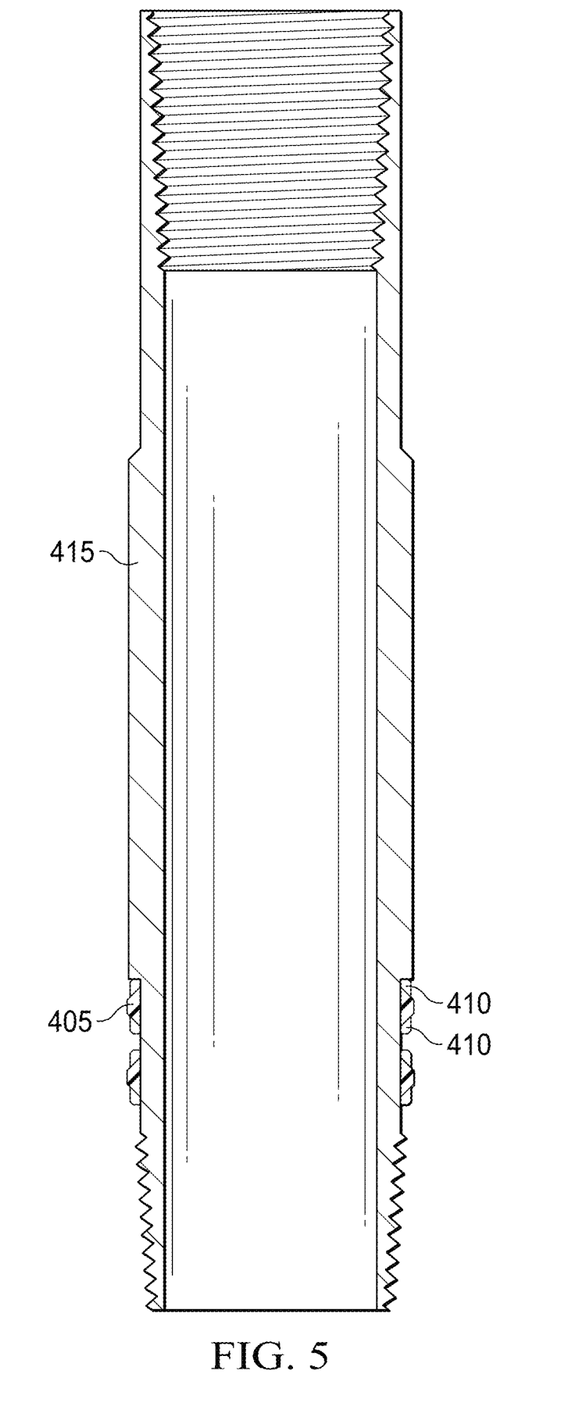
FIG. 5 is a perspective drawing illustrating an example of a molded sealing element in accordance with one or more examples described herein.

FIG. 5 is an example of a specific species of sealing element 405. Sealing element 405 is a molded seal. Anti-extrusion backup rings 410 are disposed adjacent to the sealing element 405 to ensure that the sealing element 405 will remain in its desired position during run-in and deployment. The sealing element 405 is fit to exterior grooves on the profile of a mandrel 415. The sealing element 405 expands outward to seal an adjacent annular space. The sealing element 405 comprises a positive CTE swellable elastomeric material and a negative CTE filler material. Should the wellbore temperature cool, the negative CTE filler material may expand, thereby mitigating the contraction of the positive CTE elastomeric material to some degree. The sealing element 405 may be designed such that sufficient expansive pressure from the negative CTE material is produced for the range of temperatures experienced by the wellbore.

Figure 6:
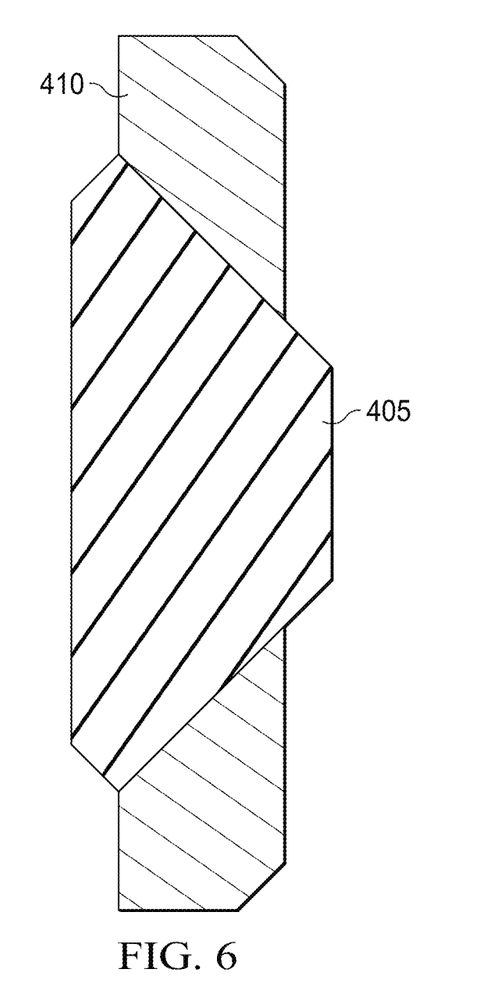
FIG. 6 is a cross-section illustration of the sealing element of FIG. 5 in accordance with one or more examples described herein.

FIG. 6 is an enlarged cross-section illustrating sealing element 405 of FIG. 5 as disposed between the anti-extrusion backup rings 410. Sealing element 405 is molded to fit over the mandrel 415 and be placed between the anti-extrusion backup rings 410.

Figure 7:
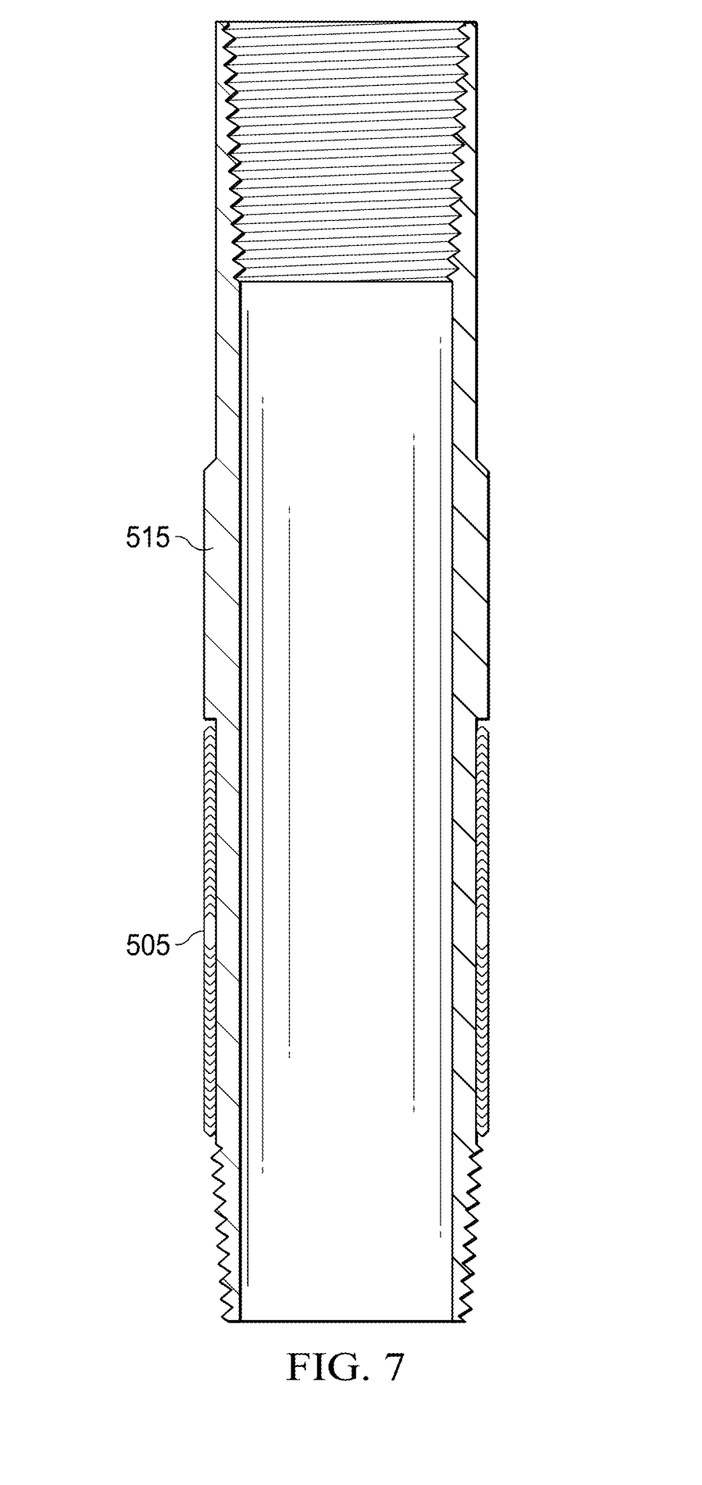
FIG. 7 is a perspective drawing illustrating an example of a V-packing seal system in accordance with one or more examples described herein.

FIG. 7 is an example of specific species of sealing element 505. Sealing element 505 is a V-packing seal system. In some examples, the sealing element 505 may be set via compression. The V-packing seal system may comprise several different types of sealing materials or the same type of sealing material each provided as individual V-shaped units (illustrated in FIG. 8). The V-shaped units are nested within one another in a series around a central sealing unit (illustrated in FIG. 8). The sealing element 505 is fit to exterior grooves on the profile of a mandrel 515. The sealing element 505 expands outward to seal an adjacent annular space. The individual V-shaped units of the sealing element 505 may comprise a composite of the positive CTE swellable elastomeric material and a negative CTE filler material. Alternatively, the individual V-shaped units of the sealing element 505 may comprise one of the positive CTE swellable elastomeric material or the negative CTE filler material. In some optional examples, additional materials such as metal sealing materials may also be used for one or more of the individual V-shaped units of the sealing element 505. Should the wellbore temperature cool, the negative CTE filler material may expand, thereby mitigating the contraction of the positive CTE elastomeric material to some degree. The sealing element 505 may be designed such that sufficient expansive pressure from the negative CTE material is produced for the range of temperatures experienced by the wellbore.

Figure 8:
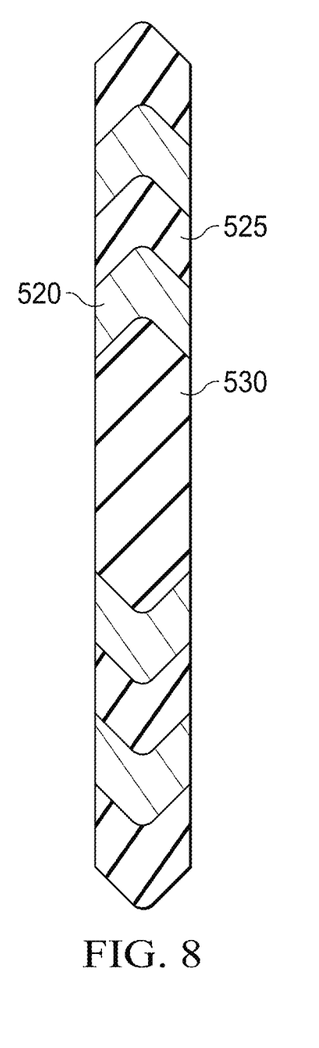
FIG. 8 is a cross-section illustration of the V-packing seal system of FIG. 7 in accordance with one or more examples described herein.

FIG. 8 is an enlarged cross-section illustrating sealing element 505. In this example, the central sealing unit 530 may comprise a positive CTE material, a negative CTE material, or a combination of a positive CTE material and negative CTE material. Likewise, V-shaped sealing units 520 and 525 may each individually comprise a positive CTE material, a negative CTE material, or a combination of a positive CTE material and negative CTE material as desired. The use of both the positive CTE material and negative CTE material, whether as a composite material or as individual sealing units (e.g., sealing units 520, 525, etc.), allows for the sealing element 505 to maintain a degree of expansion in a cooling wellbore environment.

It should be clearly understood that the example systems illustrated by FIGS. 1-8 are merely general applications of the principles of this disclosure in practice, and a wide variety of other examples are possible. Therefore, the scope of this disclosure is not limited in any manner to the details of FIGS. 1A-8 as described herein.

The negative CTE materials may include any material having a negative CTE. Examples of these materials are those that function via geometric frustration effects, those that function via Martensitic structural transitions, those that function via lattice changes, metal phosphates, metal molybdates, metal vanadates, those that function via a magneto-volume effect, those that function via a flexible network effect, ferroelectric materials, and the like. Geometric frustration refers to the packing density of the compound's crystal lattice structure. These materials may exhibit a combined rotational mode and translational mode that has the effect of pulling the overall structure together as heating puts more energy into the vibrations. These species of negative CTE materials may include, but are not, limited to metal tungstates such as zirconium tungstate ($ZrW_2O_8$), hafnium tungstate ($HfW_2O_8$), and magnesium hafnium tungstate ($MgHf(WO_4)_3$). A metal tungstate is a metal salt of tungstic acid that can have a negative thermal expansion. Not all tungsten-based materials are sufficient for use. For example, tungsten carbide is a ceramic that has a positive thermal expansion. Other negative CTE materials may be those that have a negative CTE due to volumetric increases as the temperature decreases due to a martensitic structural transition from hexagonal to orthorhombic structure. These negative CTE materials are referred to as Martensitic structural transition materials. Examples of these species of negative CTE materials may include, but are not limited to, MnCoGe compounds alloyed with In, Ni, Cr, Ga, and/or Sb. Specific examples include, Mn1-xInxCoGe, Mn1-xNixCoGe, MnCo1-xCrxGe, MnCoGe1-xSbx, MnCoGe1-xInx, MnCoGe1-xGax. Another class of negative CTE materials are those that function due to lattice changes. These species of negative CTE materials include alloys based on (Bi, La)NiO$_3$, for example, BiNi$_1$-xFexO$_3$ and alloys based on Mn—Sn—Zn—N, such as antiperovskite manganese nitride, and $ScF_3$. One other class of negative CTE materials are the metal phosphates which includes, but is not limited to $Zr_2P_2WO_{12}$ and $Hf_2P_2WO_{12}$. Metal molybdates are another class of negative CTE materials. Another class of negative CTE materials are metal vanadates such as $HfV_2O_7$ and $ZrV_2O_7$.; Some negative CTE materials utilize a magnetovolume effect. Specific species of this class of materials include, but are not limited to, CuO nanoparticles, $CoO_3$, and MnSnZnN. Some ferroelectric materials have a negative CTE. Examples of negative CTE ferroelectric materials include, but are not limited to, $PbTiO_3$ and $BiNiFeO_3$. Lastly, some negative CTE materials function via a flexible network effect, without limitation, one example of which is $Zr(WO_4)_2$. The negative CTE materials may also include any combination of the above with any other of the above or other negative CTE materials not explicitly described.

Examples of the positive CTE material may include thermoplastics, polyetheretherketone (including glass-filled and reinforced variants), hydrogenated acrylonitrile butadiene rubber, fluorocarbon-based fluoroelastomers, tetrafluoroethylene and propylene copolymers, perfluoroelastomers, or any combination of positive CTE materials.

In some examples, the negative CTE filler material may be added to the positive CTE material. In alternative examples, the positive CTE material may be added to the negative CTE material. In one specific example, the negative CTE filler material may be compounded into the positive CTE material as a powder. In some examples it may be added at a rate of 5 parts per hundred to 50 parts per hundred. The sealing elements may formed by any sufficient method including compression molding, injection molding, and the like.

In some examples the negative CTE material has a particle size between about 0.01 micron to about 100 microns. In some examples, the negative CTE powder may have two or more sizes to increase the packing density of the negative CTE material within the positive CTE material. In some examples, the negative CTE material has a distribution of particle sizes (e.g., greater than 50% of the particles have a 10× distribution in mean particle sizes) in order to increase the packing density. In some examples, nanoparticles of the negative CTE filler material may be used.

In some optional examples, the negative CTE filler material is surface treated to improve the bond between the negative CTE filler material and the positive CTE material. One example of a surface treatment is to pretreat the CTE filler material with a conversion layer such as a zirconium conversion layer before compounding the negative CTE material with the positive CTE material. In another example, a siloxane surface pretreatment is used on the negative CTE filler material.

It is to be understood that not all negative CTE materials are sufficient for inclusion into the sealing elements as described herein. In a cooling environment, some negative CTE materials may expand in one direction while contracting in the other directions. These materials are not sufficient for use in the present examples despite having a negative CTE in one direction. Examples of these materials include, but are not limited to, certain titanium alloys.

The sealing elements may be used in any application in which annular sealing is desirable. The sealing elements may be used in conjunction with compression-set packer elements, liner hangers, swellable packers, of with other wellbore tools and components. Additionally, the sealing elements may be used in a variety of wells, for example, geothermal wells; injection wells that inject water, steam, carbon dioxide, or hydrogen; and producing wells.

In some examples, sealing elements may be encapsulated with a third material, such as another layer of elastomer. Encapsulation may improve tear resistance of the seal or corrosion resistance of the negative CTE filler material.

The exemplary sealing elements disclosed herein may directly or indirectly affect one or more components or pieces of equipment associated with or which may come into contact with the sealing elements such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Provided are sealing elements in accordance with the disclosure and the illustrated FIGs. An example sealing element comprises a material having a positive coefficient of thermal expansion (CTE), and a material having a negative CTE. The sealing element may be configured to be disposed on a wellbore tool and to be positioned in a wellbore.

Additionally or alternatively, the sealing elements may include one or more of the following features individually or in combination. The negative CTE material may be a metal tungstate; a MnCoGe compound alloyed with at least one of In, Ni, Cr, Ga, or Sb; alloys of $(Bi,La)NiO_3$; metal phosphates; metal molybdates; metal vanadates; $ScF_3$; CuO nanoparticles; $PbTiO_3$; $CoO_3$; $BiNiFeO_3$; MnSnZnN; $Zr(WO_4)_2$; or any combination. The positive CTE material may be a thermoplastic, polyetheretherketone, a hydrogenated acrylonitrile butadiene rubber, a fluorocarbon-based fluoroelastomer, a tetrafluoroethylene and propylene copolymer, a perfluoroelastomer, or any combination. The sealing element may expand by compression of the sealing element. The sealing element may expand by absorption of a fluid. The sealing element may expand by stretching. The sealing element may be disposed on a wellbore packer, a wellbore tubing, a wellbore conduit, a wellbore tool, or a mandrel. The negative CTE material may have a particle size between about 0.01 micron to about 100 microns. The negative CTE material may be surface treated and then compounded with the positive CTE material. The surface treatment may be the application of a zirconium conversion layer. The sealing element may be formed by compression molding or injection molding.

Provided are methods for performing a sealing operation in a subterranean formation in accordance with the disclosure and the illustrated FIGs. An example method comprises introducing a sealing element into a wellbore having a temperature; wherein the sealing element comprises: a material having a positive coefficient of thermal expansion (CTE), and a material having a negative CTE. The method further comprises expanding the sealing element to contact an adjacent surface. The material having a negative CTE expands when the wellbore temperature is decreasing. The expansion of the negative CTE material maintains contact of the sealing element with the adjacent surface while the wellbore temperature is decreasing.

Additionally or alternatively, the method may include one or more of the following features individually or in combination. The sealing element may be a component of a swell packer and the expanding the sealing element to contact an adjacent surface comprises contacting the sealing element with a fluid or allowing the sealing element to contact the fluid. The sealing element may be a component of a compression set element and the expanding the sealing element to contact an adjacent surface comprises compressing the sealing element. The sealing element may be a component of a liner hanger and the expanding the sealing element to contact an adjacent surface comprises stretching the sealing element. The negative CTE material may be a metal tungstate; a MnCoGe compound alloyed with at least one of In, Ni, Cr, Ga, or Sb; alloys of (Bi,La)NiO$_3$; metal phosphates; metal molybdates; metal vanadates; ScF$_3$; CuO nanoparticles; PbTiO$_3$; CoO$_3$; BiNiFeO$_3$; MnSnZnN; Zr(WO$_4$)$_2$; or any combination. The positive CTE material may be a thermoplastic, polyetheretherketone, a hydrogenated acrylonitrile butadiene rubber, a fluorocarbon-based fluoroelastomer, a tetrafluoroethylene and propylene copolymer, a perfluoroelastomer, or any combination. The sealing element may expand by compression of the sealing element. The sealing element may expand by absorption of a fluid. The sealing element may expand by stretching. The sealing element may be disposed on a wellbore packer, a wellbore tubing, a wellbore conduit, a wellbore tool, or a mandrel. The negative CTE material may have a particle size between about 0.01 micron to about 100 microns. The negative CTE material may be surface treated and then compounded with the positive CTE material. The surface treatment may be the application of a zirconium conversion layer. The sealing element may be formed by compression molding or injection molding.

Provided are systems for performing a sealing operation in a subterranean formation in accordance with the disclosure and the illustrated FIGs. An example system comprises a sealing element comprising: a material having a positive coefficient of thermal expansion (CTE), and a material having a negative CTE. The system further comprises the wellbore tool on which the sealing element is disposed.

Additionally or alternatively, the system may include one or more of the following features individually or in combination. The sealing element may be a molded seal, crimp seal, or a V-packing seal system. The sealing element may be the V-packing seal system and the positive CTE material comprises a sealing unit of the V-packing seal system and the negative CTE material comprises a different sealing unit of the V-packing seal system. The wellbore tool may be a wellbore packer, a wellbore tubing, a wellbore conduit, a liner, or a mandrel. The sealing element may be formed by compression molding or injection molding. The sealing element may be a component of a swell packer and the expanding the sealing element to contact an adjacent surface comprises contacting the sealing element with a fluid or allowing the sealing element to contact the fluid. The sealing element may be a component of a compression set element and the expanding the sealing element to contact an adjacent surface comprises compressing the sealing element. The sealing element may be a component of a liner hanger and the expanding the sealing element to contact an adjacent surface comprises stretching the sealing element. The negative CTE material may be a metal tungstate; a MnCoGe compound alloyed with at least one of In, Ni, Cr, Ga, or Sb; alloys of (Bi,La)NiO$_3$; metal phosphates; metal molybdates; metal vanadates; ScF$_3$; CuO nanoparticles; PbTiO$_3$; CoO$_3$; BiNiFeO$_3$; MnSnZnN; Zr(WO$_4$)$_2$; or any combination. The positive CTE material may be a thermoplastic, polyetheretherketone, a hydrogenated acrylonitrile butadiene rubber, a fluorocarbon-based fluoroelastomer, a tetrafluoroethylene and propylene copolymer, a perfluoroelastomer, or any combination. The sealing element may expand by compression of the sealing element. The sealing element may expand by absorption of a fluid. The sealing element may expand by stretching. The sealing element may be disposed on a wellbore packer, a wellbore tubing, a wellbore conduit, a wellbore tool, or a mandrel. The negative CTE material may have a particle size between about 0.01 micron to about 100 microns. The negative CTE material may be surface treated and then compounded with the positive CTE material. The surface treatment may be the application of a zirconium conversion layer. The sealing element may be formed by compression molding or injection molding.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for performing a sealing operation, the method comprising:
   introducing a sealing element into a wellbore having a temperature; wherein the sealing element comprises:
   a material having a positive coefficient of thermal expansion (CTE), wherein the positive CTE material is: a thermoplastic, polyetheretherketone, a hydrogenated acrylonitrile butadiene rubber, a fluorocarbon-based fluoroelastomer, a tetrafluoroethylene and propylene copolymer, a perfluoroelastomer, or any combination thereof; and
   a material having a negative CTE, wherein the negative CTE material is: a metal tungstate; a MnCoGe compound alloyed with at least one of In, Ni, Cr, Ga, or Sb; alloys of (Bi,La) $NiO_3$; metal phosphates; metal molybdates; metal vanadates; $ScF_3$; CuO nanoparticles; $PbTiO_3$; $CoO_3$; $BiNiFeO_3$; MnSnZnN; $Zr(WO_4)_2$; or any combination thereof;
   wherein the negative CTE material is compounded with the positive CTE material;
   expanding the sealing element to contact an adjacent surface by applying an external force to the sealing element; and
   wherein the material having a negative CTE expands when the wellbore temperature is decreasing; wherein the expansion of the negative CTE material maintains contact of the sealing element with the adjacent surface while the wellbore temperature is decreasing.

2. The method of claim 1, wherein the sealing element is a component of a swell packer and the expanding the sealing element to contact an adjacent surface comprises contacting the sealing element with a fluid or allowing the sealing element to contact the fluid.

3. The method of claim 1, wherein the sealing element is a component of a compression set element and the expanding the sealing element to contact an adjacent surface comprises compressing the sealing element.

4. The method of claim 1, wherein the sealing element is a component of a liner hanger and the expanding the sealing element to contact an adjacent surface comprises stretching the sealing element.

5. The method of claim 1, wherein the sealing element is disposed on a wellbore packer, a wellbore tubing, a wellbore conduit, a wellbore tool, or a mandrel.

6. The method of claim 1, wherein the negative CTE material has a particle size between about 0.01 micron to about 100 microns.

7. The method of claim 1, wherein the negative CTE material is surface treated prior to compounding with the positive CTE material.

8. The method of claim 7, wherein the surface treatment is the application of a zirconium conversion layer.

9. The method of claim 1, wherein the sealing element is formed by compression molding or injection molding.

10. The method of claim 1, wherein the sealing element is a molded seal, crimp seal, or a V-packing seal system.

11. The method of claim 1, wherein the wellbore temperature decreases after the expansion of the sealing element.

12. The method of claim 1, wherein the positive CTE material is an elastomer.

13. The method of claim 1, wherein the negative CTE material is compounded with the positive CTE material by adding the negative CTE material to the positive CTE material at a rate of 5 parts per hundred to 50 parts per hundred.

14. The method of claim 1, wherein the negative CTE material has a distribution of particle sizes such that greater than 50% of the negative CTE particles have a 10× distribution in mean particle sizes.

15. The method of claim 1, wherein at least some of the negative CTE material comprises nanoparticles.

16. The method of claim 1, wherein the negative CTE material is pretreated with a siloxane surface pretreatment prior to compounding with the positive CTE material.

17. The method of claim 1, wherein the negative CTE material does not comprise a titanium alloy.

18. The method of claim 1, wherein the sealing element is coated with an elastomer.

* * * * *